United States Patent [19]

Siebert

[11] 4,061,985
[45] Dec. 6, 1977

[54] LASER FUSION PULSE SHAPE CONTROLLER

[75] Inventor: Larry D. Siebert, Ann Arbor, Mich.

[73] Assignee: KMS Fusion, Inc., Ann Arbor, Mich.

[21] Appl. No.: 649,864

[22] Filed: Jan. 16, 1976

[51] Int. Cl.² .............................................. H01S 3/10
[52] U.S. Cl. ......................... 331/94.5 C; 331/94.5 M
[58] Field of Search ................. 331/94.5; 350/160, 161

[56] References Cited

U.S. PATENT DOCUMENTS

| 3,521,069 | 7/1970 | DeMaria et al. | 331/94.5 Q |
| 3,597,695 | 8/1971 | Swain et al. | 331/94.5 Q |

*Primary Examiner*—William L. Sikes

*Attorney, Agent, or Firm*—Barnes, Kisselle, Raisch & Choate

[57] ABSTRACT

An apparatus for controlling the pulse shape, i.e., the pulse duration and intensity pattern, of a pulsed laser system, and which is particularly well adapted for controlling the pellet ignition pulse in a laser-driven fusion reaction system. The apparatus comprises a laser generator for providing an optical control pulse of the shape desired, a pulsed laser triggered by the control pulse, and a plurality of optical Kerr-effect gates serially disposed at the output of the pulsed laser and selectively triggered by the control pulse to pass only a portion of the pulsed laser output generally corresponding in shape to the control pulse.

7 Claims, 1 Drawing Figure

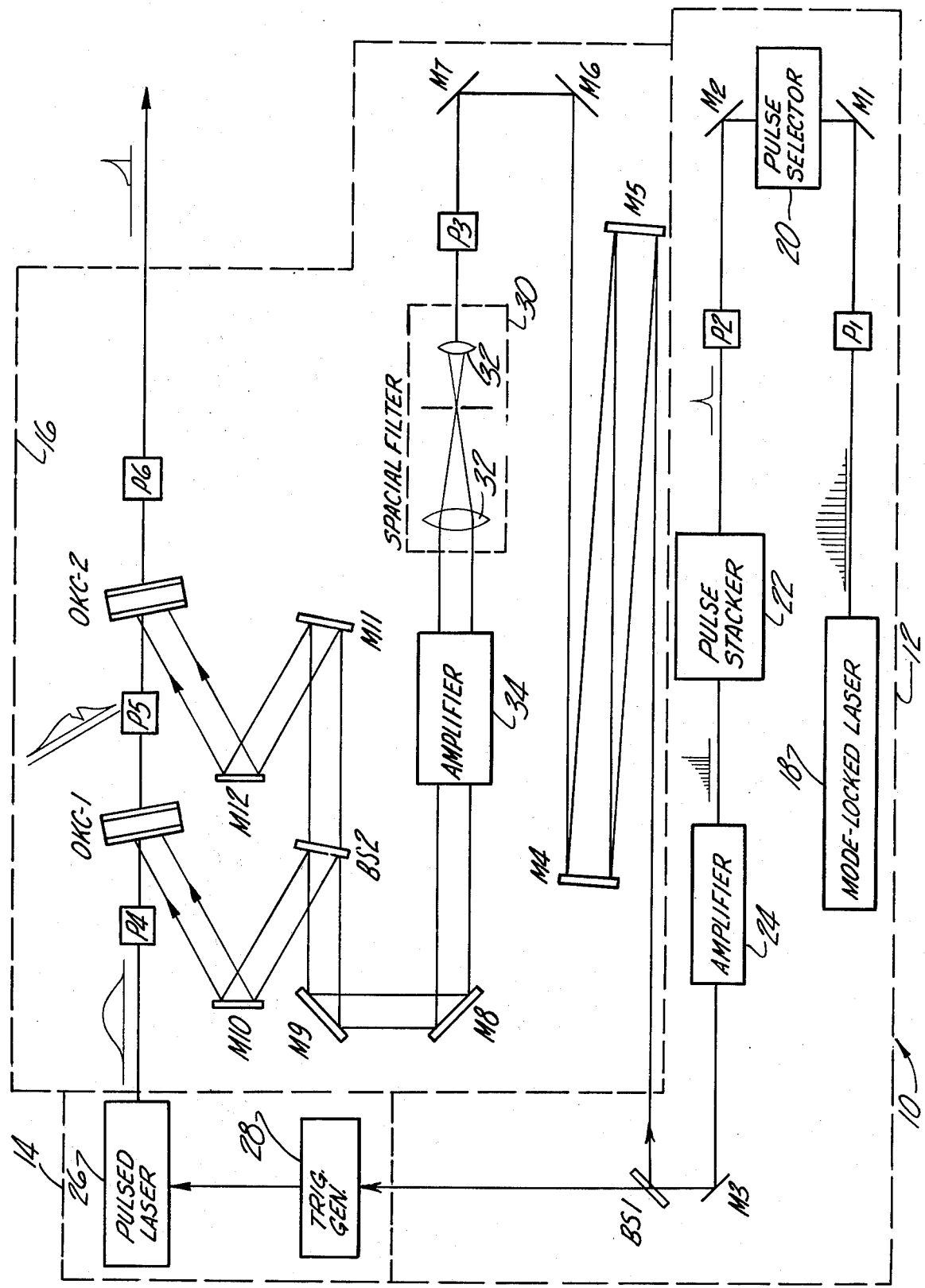

LASER FUSION PULSE SHAPE CONTROLLER

The present invention relates to laser systems and, more particularly, to systems for generating an optical pulse of preselected waveform or shape, i.e., of preselected time duration and intensity pattern.

Apparatus for generating an optical pulse of preselected waveform or shape is shown in the U.S. Pat. No. of Carlton E. Thomas 3,879,109. In the apparatus therein disclosed, a single mode-locked laser output pulse having a duration on the order of thirty picoseconds is selected and fed to a system of beam splitters and mirrors by means of which the laser pulse is split into several separate pulses. The split pulses are selectively attenuated and delayed, and then recombined to form a composite output pulse having a waveform, i.e., duration and intensity pattern, which is the sum, over time, of the individually tailored split pulses. The output pulse or signal from the Thomas apparatus is thus, in effect, a composite of several individually tailored and timed pulses "stacked" upon one another. Hence, the Thomas apparatus has been referred to in the art and is referred to hereinafter as a "pulse stacker".

The apparatus disclosed in the above-referenced Thomas patent is well suited, as noted therein, for use in controlling the duration and intensity pattern of a pellet ignition pulse in a laser-driven fusion reactor system. Indeed, the Thomas apparatus has been used quite successfully in this application. However, there is a slight "ripple" in the composite output of the Thomas device caused by interference between adjacent stacked pulses. This ripple may have an adverse effect upon controlled laser fusion and is, therefore, deemed to be undesirable.

Furthermore, the short input pulse required by the pulse stacker, thirty picoseconds in the example given, may be supplied, according to conventional technology, only by a bandwidth limited mode-locked laser. A thirty picosecond pulse from a mode-locked laser may have a bandwidth of only 0.5 Angstroms, for example. However, it may be desirable in some fusion applications to initiate pellet ignition with a pulse having a bandwidth on the order of 50 Angstroms, for example. Such bandwidths are obtainable, according to present technology, using Q-switched or cavity dumped lasers; but lasers of these types have long output pulses which cannot be conveniently tailored for use as an input to a pulse stacker.

It is an object of the present invention to provide a system for closely controlling the duration and intensity pattern of an optical pulse, and specifically for controlling an ignition pulse in a laser-driven fusion reactor system.

It is another object of the present invention to provide a laser system capable of producing a broadband output pulse of preselected shape.

It is a more specific object of the present invention to provide an optical pulse shape controller which is particularly adapted for use in a laser-driven fusion reactor system in combination with the above-described Thomas apparatus, which minimizes or eliminates the undesirable "ripple" effect in the stacked control pulse, and which provides a smooth, sharp, broad-band output pulse of preselected and closely controlled duration and intensity pattern.

In summary, the above-stated and other objects are achieved in accordance with the present invention by using the stacked output of the Thomas apparatus as a trigger signal for a broad-band pulsed laser, and as a control signal for one or more Kerr-effect light gates or cells disposed in series with the pulsed laser output to selectively pass or gate only a portion of the pulsed laser beam. The laser-triggering and gate-control pulses preferably comprise appropriately delayed and timed portions of a single composite pulse from the Thomas stacker. That portion of the pulsed laser beam gated by the cells has a frequency spectrum equal to that of the pulsed laser output, but has a duration and intensity pattern dictated by the shape of the gate-control portion of the stacked pulse. Furthermore, the Kerr cell or cells have a "smoothing" effect upon the gate-control signal such that ripple in the gated portion of the laser beam is greatly reduced as compared to the control signal. A Kerr-effect light gate of the type described hereinafter is disclosed in Duguay et al., "An Ultrafast Light-Gate", Applied Physics Letters, Vol. 15, Number 6, Sept. 15, 1969, pages 192–194.

The novel features which are considered to be characteristic of the present invention are set forth in particular in the appended claims. The invention itself, however, together with additional objects, features and advantages thereof, may be best understood from the following description when read in conjunction with the accompanying drawing which is a schematic diagram of an exemplary but presently preferred embodiment of the laser fusion pulse shape controller provided by the present invention.

Referring to the drawing, the presently preferred embodiment 10 shown therein of the pulse shape controller provided by the present invention generally comprises a laser generator 12 for providing an optical control pulse of a preselected desired shape, i.e., duration in time and intensity pattern, a pulsed laser system 14 triggered by the output from generator 12, and at least one optical Kerr-effect gate and associated control apparatus 16 disposed at the output of laser system 14 and selectively triggered by the control pulse to gate or pass only a selected portion of the pulsed laser output generally corresponding to the shape of the control pulse.

More specifically, control pulse generator 12 includes a mode-locked laser 18 which provides at its output a series of optical pulses. It will be understood, of course, that the pulse series shown at the output of laser 18, and other pulse series or pulse shapes shown in the drawing and to be discussed hereinafter, are schematic representations of typical outputs, which representations have been provided to facilitate an understanding of the invention and should not be construed to place any undue limitations thereon. The output of laser 18 is fed through a polarizer P1, and is routed by mirrors M1,M2 through a pulse selector 20, which may comprise a conventional Pockels cell for example, through a second polarizer P2 and onto a pulse stacker 22, the input to stacker 22 thereby being a selected pulse from the pulse series presented at the output of laser 18 and being polarized in a selected direction. Stacker 22 is preferably of the type disclosed in the above-referenced Thomas patent, the disclosure of which is incorporated herein by reference, and provides at its output a composite stacked pulse which is the sum of a number of individually tailored pulses. For optimum pellet ignition in a fusion reactor system, as disclosed in the Thomas patent, the initial energy of the composite output of stacker 22 should be low, increasing rapidly as implosion proceeds and then falling off very rapidly after peak power is attained. Composite pulse length may be between 100 and 800 picoseconds. The output of stacker 22 is fed through a suitable amplifier 24 into a mirror M3 and then to a beam splitter BS1. Thus, control pulses which are identical in shape but which may have differing intensities depending upon the reflective-transmittance ratio of beam splitter BS1 are provided by generator 12 to laser system 14 and gate 16.

Laser system 14 includes a pulsed laser 26 which is triggered by a control signal fed from generator 12 via high voltage switch or trigger generator 28. Laser 26, which may be a Q-switched or cavity dumped neodymium/glass laser for example, provides a broad spectrum pulse at its output which may be on the order of 30 nanoseconds in duration.

The control pulse from generator 12 is incident in gate 16 on mirror M5 and is fed back and forth between mirror M5 and a second mirror M4 for a selected delay time, the purpose of which will be evident from the discussion to follow. After being thus delayed, the control pulse is fed via mirrors M6 and M7 through a polarizer P3, and through a spatial filter 30 having one or more lenses 32 to expand the diameter of the pulse beam. From spatial filter 30, the pulse is fed through an amplifier 34 to mirrors M8,M9 and onto a 50/50 beam splitter BS2. That portion of the incident pulse reflected by beam splitter BS2 is fed to a mirror M10, while that portion transmitted through the beam-splitter is routed to the successive mirrors M11 and M12. A Kerr-effect gate, comprising a pair of optical Kerr cells OKC-1 and OKC-2 and associated alternately crossed polarizers P4,P5 and P6, is serially disposed at the output of laser 26, polarizer P5 being disposed between cells OKC-1 and OKC-2. Gate control pulses are incident upon cells OKC-1 and OKC-2 from mirrors M10 and M12 respectively.

In operation, mirrors M4,M5 delay the input to amplifier 34 with respect to the triggering signal to laser 26 such that the gate control pulses to cells OKC-1 and OKC-2 arrive at a time coincident with the arrival of the peak of the Gaussian output from laser 26 at the respective cells. By passing through alternately crossed polarizers P4,P5, the electric field vector of the pulsed laser beam is at an angle of 45° with respect to the electric field of the gate control pulses incident upon the respective cells OKC-1,OKC-2. The intensity of the control pulses, controlled by amplifier 34, induces sufficient birefringence in the respective cells to rotate the plane of polarization of a selected portion of the pulsed laser beam and to permit passage of only that through the crossed polarizers. Thus, assuming that the output of laser amplifier 34 is polarized in the plane of the paper, the polarization angle at polarizers P4,P5 and P6 would be 45°, −45° and 45°, respectively. The degree of diametric beam expansion imparted to the control pulses by filter 30 is such that the respective pulses incident upon cells OKC-1 and OKC-2 illuminate at least a portion of the cell liquid of sufficient diameter and depth to have the desired polarizing effect over the entire diameter of the pulsed laser beam.

The transfer function of an optical Kerr cell is given by the equation:

$$T(t) = \sin^2[N_{2B} - P_c(t)(L/\lambda)\pi]$$

wherein $N_{2B}$ is the optical Kerr birefringence coefficient of the Kerr liquid, $L$ is the cell length, $\lambda$ is the wavelength of the output from laser 26, and $P_c(t)$ is the time dependent power density of the control beam. Thus, the gated or "sliced out" portion of the pulsed laser output will correspond to the desired pulse shape selected and tailored by stacker 22. The remainder of the pulsed laser output is reflected from polarizer P5.

The non-linear response function of the Kerr cells set forth in equation (1) yields additional advantages. The contrast ratio of the output signal from polarizer P6 measured in decibels (db) between baseline noise and pulse intensity is doubled as compared to the output of stacker 22. With two optical Kerr cells, contrast ratios on the order of $10^6$ to 1 may be obtained. Furthermore, the effect of small fluctuations or ripples in the control pulse, i.e., stacker output, is reduced by a factor of two (measured in db) in each cell when the maximum amplitude of the control pulse is set to drive the birefringence of the Kerr cell to one-half wavelength, i.e., when $$N_{2B} - P_c(\max)(L/\lambda)\pi = \pi/2$$

thus the effect of ripple in the stacker output is reduced by a factor of four for two Kerr cells.

From the foregoing description it will now be apparent that the laser fusion pulse shape controller provided by the present invention fully satisfies all of the objects, features and advantages set forth hereinabove. Furthermore, although the invention has been described in conjunction with a specific, presently preferred embodiment thereof, it will be apparent that many alternatives, modifications and variations will suggest themselves to persons skilled in the art in view of the foregoing description. For example, the provisions of mirrors M1-M3 and M6-M12 are obviously optional depending on the orientation of the remaining components of the system relative to straight beam paths, more or less mirrors being required for differing component orientations. Indeed, either or both of the mirrors M4 and M5 may also be eliminated where other delay means are provided, such as a long travel distance between beam splitter BS1 and polarizer P3, for example. Moreover, more or less Kerr gates, each comprising an additional Kerr cell and a polarizer, may be provided where more or less contrast is desired in the output signal.

Furthermore, it will be apparent that the relative orientation of certain components shown in the drawing, such as the particular configuration of mirrors, polarizers, amplifiers and beam splitters, are a matter of convenience. Moreover, it will be evident that, although the invention has been disclosed as a pulse shape controller adapted for use in laser fusion, the principles of the invention are equally applicable to other application wherein the shape of a pulsed laser output is to be closely controlled, and, indeed, may be applied to types of pulses electromagnetic energy systems other than pulsed laser systems. Accordingly, the invention is intended to embrace these and all other such alternatives, modifications and variations as fall within the spirit and broad scope of the appended claims.

The invention claimed is:

1. An optical pulse shape controller comprising a first energy source responsive to an optical trigger signal to generate a light beam, a Kerr-effect gate including at least one Kerr cell disposed at the output of said first source and responsive to an optical control signal to gate only a selected portion of said light beam, said selected portion being a function of the duration and intensity pattern of said optical control signal, a second source of pulsed light energy, and means disposed at the output of said second source and responsive to an output light pulse from said second source to provide said optical trigger signal and said optical control signal of preselected duration and intensity pattern.

2. The controller set forth in claim 1 wherein said means disposed at the output of said second energy source comprises means forming an optical output pulse from said second source into a preselected pulse shape, means splitting said pulse of preselected shape into said optical trigger signal and said optical control signal, means feeding said trigger signal to said first source of electromagnetic energy and means feeding said control signal to said gate, said last-named means including means delaying said control signal to arrive at said gate at a time coincident with a selected portion of said beam.

3. The controller set forth in claim 2 wherein said Kerr-effect light gate comprises first and second optical Kerr cells serially disposed at the output of said first source, said control signal being fed to said first and second cells at times coincident with arrival thereat of said selected portions of said beam.

4. The controller set forth in claim 1 wherein both said preselected duration of said optical control signal and said duration of said selected portion of said light beam are in the picosecond range.

5. The controller set forth in claim 4 wherein said first energy source comprises a Q-switched laser, and wherein said second energy source comprises a mode-locked laser.

6. Apparatus for generating an electromagnetic energy pulse of preselected shape and duration comprising a first electromagnetic energy source responsive to a trigger pulse to provide a beam of electromagnetic energy, means including at least one Kerr-effect light gate disposed at the output of said first source and responsive to a control pulse to pass a selected portion of said beam, a second energy source providing a pulse of electromagnetic energy, and means disposed at the output of said second source and responsive to said pulse to provide said trigger pulse and said control pulse, said last-named means including means splitting said pulse into a plurality of separate pulses, means individually attenuating and delaying said plurality of split pulses, and means recombining said attenuated and delayed pulses into a composite pulse having a shape and duration corresponding to said preselected shape and duration.

7. The apparatus set forth in claim 6 wherein said pulse responsive means further includes means splitting said composite pulse into said trigger pulse and said control pulse, and means directing said control pulse onto said gate at a time coincident with the incidence on said gate of a selected portion of said beam.

* * * * *